June 1, 1926.

E. PETERSON 1,586,533

THERMIONIC METER

Filed April 27, 1922

Inventor:
Eugene Peterson
by Joel C.R. Palmer Atty.

Patented June 1, 1926.

1,586,533

UNITED STATES PATENT OFFICE.

EUGENE PETERSON, OF NEW YORK, N. Y., ASSIGNOR TO WESTERN ELECTRIC COMPANY, INCORPORATED, OF NEW YORK, N. Y., A CORPORATION OF NEW YORK.

THERMIONIC METER.

Application filed April 27, 1922. Serial No. 556,862.

This invention relates to a thermionic meter.

An object of the invention is to provide a metering device arranged in conjunction with thermionic devices for measuring the power consumed by a circuit carrying an alternating current and particularly currents of high frequency.

The invention provides a pair of thermionic devices in which the individual input circuits thereof are connected with current coils associated with a given load circuit, a potential coil also associated with the load circuit being associated with a circuit common to such input circuits. By having a direct current measuring instrument connected in the output circuits of the thermionic devices, the indications of the current in the output circuit will be a direct and instantaneous measure of the power consumed in the load circuit. Factors which tend to make the current in the output circuit of the thermionic devices not proportional to the power absorbed by the load, are averaged out over a complete cycle by the use of a direct current measuring instrument.

Figure 1:
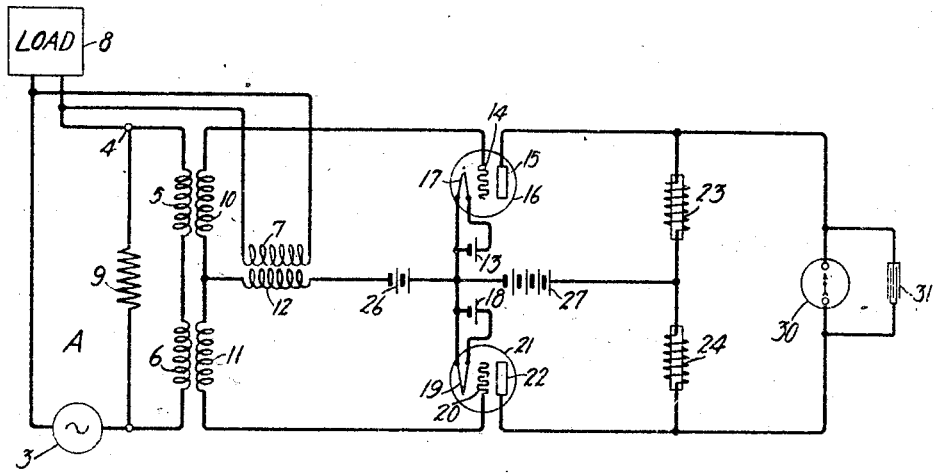
Fig. 1 illustrates one embodiment of the invention.

In Fig. 1 is shown a load circuit A having current coils connected with the individual portions of the input circuits of two vacuum tubes and a potential coil connected in a circuit common to the input circuits of the respective tubes. The output circuits of the tubes are connected with a pair of retardation coils, across which a direct current indicating instrument, such as a galvanometer or the like, is connected. This manner of connecting the apparatus provides a system of connections whereby the current in the output circuit of the two vacuum tubes, providing a direct current measuring instrument is used for averaging out certain factors introduced due to such circuit connections, is a measure of the instantaneous power consumed in the load circuit A.

In Fig. 1 a power circuit 4 is shown comprising two current coils 5 and 6 and a potential coil 7, an impedance load 8 whose power consumption is to be determined and a fixed resistance 9, all of which are connected with a generator 3 of high frequency currents. Coils 5, 6, and 7 are inductively associated with coils 10, 11, and 12, respectively, the resistance 9 being connected across the coils 5 and 6. The coil 10 is connected in the individual portion of the input circuit of the vacuum tube 16 which comprises a grid electrode 14, a plate electrode 15 and a heated filament 17. Likewise, the coil 11 is connected in the input circuit of the vacuum tube 21, which also comprises the usual grid electrode 20, heated filament 19 and a plate electrode 22. In the portion of the circuit common to the input circuits of the tubes 16 and 21, a coil 12, which is inductively associated with the potential coil 7 of the load circuit 8, is connected. The input circuit of the tube 16 thereby includes the grid electrode 14, heated filament 17, battery 26, coil 12 and coil 10 in series. Similarly the input circuit of tube 21 includes grid electrode 20, heated filament 19 and the coils 11 and 12 in series. The battery 26 supplies current of a negative polarity to the grid electrodes 14 and 20 of the vacuum tubes 16 and 21. Current for heating the filaments 17 and 19 of the respective tubes is furnished from batteries 13 and 18.

The output circuit of the tube 16 includes the plate electrode 15, retardation coil 23, battery 27 and the heated filament 17. Likewise, the output circuit of the tube 21 includes the plate electrode 22, retardation coil 24, battery 27 and the heated filament 19. Space current for the respective tubes is furnished from the battery 27. Retardation coils 23 and 24 serve as choke coils for preventing the flow of alternating current in the output circuit of the tubes 16 and 21. Connected across the retardation coils 23 and 24 is a galvanometer or other similar type of direct current measuring instrument for measuring the power consumed by the load circuit A.

By having the vacuum tubes 16 and 21 connected so that current coils, associated with the load circuit A, are in the individual portions of the input circuits thereof and a potential coil in the portion of the circuit common to the input circuits, the current in the output circuit of the tubes 16 and 21, providing a direct current measuring instrument is used for averaging out certain factors which make such current unproportional to the power consumed, will be a direct and instantaneous measure of the power absorbed by the given load circuit. These conclusions may be verified by reference to the following mathematical calculations.

With the instantaneous power equal to $$VI \cos pt \cos (pt+\phi)$$

where a current I flows through a load impedance giving rise to a potential drop of V, and due to the reactance in the load, the current and the voltage waves differ by an angle $\phi$ and the average power is equal to $$\frac{VI}{2} \cos \phi$$

V and I having maximum instantaneous values. Currents proportional to the above power terms may be made to flow in the output circuits of the tubes 16 and 21. Such an arrangement will thus establish the relation between the true power absorbed by the load 8 and the indications on a direct current measuring instrument 30 connected across the retardation coils 23 and 24, which are connected in the output circuits of the tubes 16 and 21.

The resistance 9 in shunt of the load 8 has a potential difference across its terminals of $$RI \cos (pt+\phi)$$

which is proportional to the current if the insertion of the resistance 9 does not alter materially the constants of the circuit.

If the tube characteristic is expressed as $$i = a_1 v + a_2 v^2 \quad (1)$$

where $a$ equals a constant dependent upon the type of tube used and $v$ equals the voltage of the grid electrodes, and if the two tubes are alike, the potential of the grid 14 with respect to the filament 17, will be $$v_a = RI \cos (pt+\phi) + V \cos pt \quad (2)$$

and for the grid 20

$$v_b = -RI \cos (pt+\phi) + V \cos pt \quad (3)$$

Substituting (2) and (3) in (1)

$$i_a = a_1 V \cos pt + a_1 RI \cos (pt+\phi) + a_2 V^2 \cos^2 pt + a_2 R^2 I^2 \cos^2 (pt+\phi) + 2a_2 VRI \cos pt \cos (pt+\phi) \quad (4)$$

$$i_b = +a_1 V \cos pt - a_1 RI \cos (pt+\phi) + a_2 V^2 \cos^2 pt + a_2 R^2 I^2 \cos^2 (pt+\phi) - 2a_2 VRI \cos pt \cos (pt+\phi) \quad (5)$$

Subtracting (5) from (4)

$$i_{a-b} = 2a_1 RI \cos (pt+\phi) + 4a_2 RVI \cos pt \cos (pt+\phi) \quad (6)$$

Equation 1 expresses that part of the plate current which is due to the fact that an alternating voltage $v$ has been impressed on the grid of the tube in terms of successive powers of that voltage. This is the usual form in which the relation between the grid voltage and the plate current is expressed and it will be recognized that if a constant current be added to both sides of equation (1), we have simply an expression of MacLaurin's series. This constant would be the steady space current which exists when the output is zero, and is the value about which the plate current varies when alternating voltages are impressed on the grid 14 and 20. As is well known the steady component of the plate current divides equally between impedances 23 and 24 so that there is no resultant effect on the indicator 30.

In the foregoing analysis, therefore, this steady component has been eliminated and the variable component alone has been considered.

It will be obvious that when the input circuit is closed, varying voltages are impressed upon the grids of tubes 16 and 21, grid 14 being positive when grid 20 is negative, and the variable component of the plate current is affected correspondingly. As will appear from the following analysis this variable component does not average zero during each cycle but results in an average which is directly proportional to the power expended in the load circuit. It will be recognized that the use of the first two powers of $v$ is an approximation of the true state of affairs, but under certain circumstances, that is, with small voltages impressed on the grid, equation (1) is sufficiently exact for the present purpose. In the later equations subscripts $a$ and $b$ are used to designate quantities which refer to the two tubes in Figs. 1 and 2, that is, $a$ for definiteness is supposed to represent tube 15, and $b$ tube 21. Thus, $v_a$ represents the voltage applied to the grid circuit of tube 15 and $v_b$ represents the grid voltage of tube 21. It will therefore be seen that $a$, $b$, $a_1$ and $a_2$ do not all represent the same quantities.

The first term of the right-hand member in (6), which makes the current in the output circuits of the tubes 16 and 21 non-proportional to the measure of the power, is averaged out over a complete cycle by the use of a direct current measuring instrument so that this term may therefore be disregarded.

Discussing the right hand member of equation 6 in detail, the first term is proportional to the cosine of an angle and the second term is proportional to the product of two cosines. Now, by the elementary rules of trigonometry, it may be shown that the product of two cosines of the same frequency is equal to a constant term plus the cosine of twice the angle involved in the original equation. Another fact which bears on the interpretation of this equation is that the average value of any cosine function or of any sine function over a complete cycle of values of the angle is precisely zero.

Since the second term of the right-hand member in (6) represents the instantaneous power in the load 8, the average current in the tube circuit is then $$(i_{a-b})_{avg} = \frac{1}{2\pi}\int_0^{2\pi} i_{(a-b)} dt = 4a_2 R \frac{VI}{2} \cos \phi \quad (7)$$

The above expression is thus proportional to the average power in the load. Such a result is given directly by the device 30. The device 30 may be shunted by a condenser 31 to provide a low impedance path so that the constants of equation 1 remain unaltered. The object of the mathematical treatment presented is to show that the alternating current does not average out during each cycle, except when $\cos \phi$ is 0. This is, however, a necessary condition for a wattmeter, since in that case the power dissipated would be zero and the deflection of an instrument which purports to read power should consequently be zero. It will be noted that the constant term is produced by the term $a_2 v^2$ in equation (1), which provides that a product of cosine terms be obtained. This is characteristic of a modulator.

Figure 2:
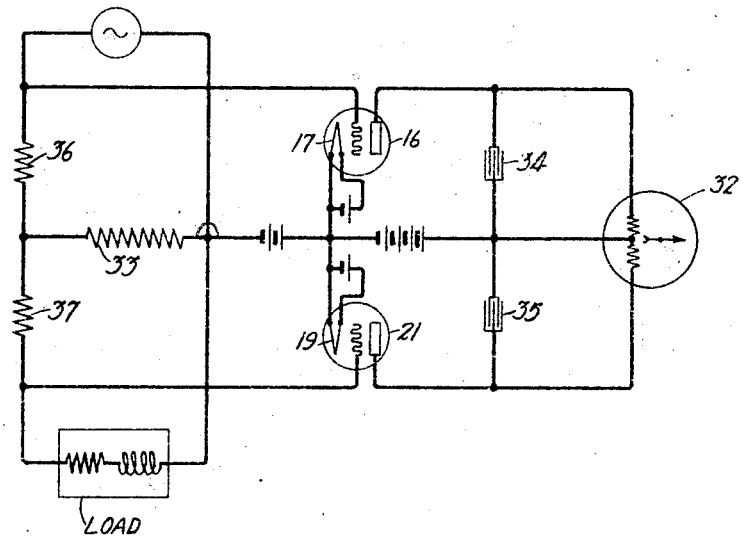
Fig. 2 illustrates a modification of the arrangement shown in Fig. 1, in which the load circuit is directly connected with the input circuits of the vacuum tubes.

The arrangement shown in Fig. 2 is similar to that of Fig. 1 except in the former the load is connected to the grid circuits of the tubes 16 and 21 through resistances 33, 36, and 37 in place of transformers as in Fig. 1. Such an arrangement permits more uniformity over a wider frequency range. Also a differential measuring instrument 32 is connected to the plate circuit in place of the usual type of instrument and the retardation coils 23 and 24 are supplanted by condensers 34 and 35, respectively. From equation 7, from which it appears that the deflection of a differential meter will be proportional to $a_2$, it follows that it is preferable to work on that part of the curve characteristic for which $a_2$ is as large as possible. This is true of the region of the tube characteristic which exhibits pronounced curvature.

With the arrangement shown in Fig. 2 it is possible to calibrate the instrument 32 with direct current, for if the direct current voltage is $V_0$ and the current $I_0$, $$i_{(a-b)} = 2a_1 R_0 I_0 + 4a_2 V_0 R_0 I_0 \quad (8)$$

Connecting the midpoint of the filaments 17 and 19 to the series resistance 33 gives $$i_{(a-b)} = 2a_1 R_0 I_0 \quad (9)$$

The difference between the two readings, as given by equations (8) and (9), may then be used for calibration.

Although a specific circuit arrangement has been described hereinabove by means of which the power consumed by a load supplied with high frequency current may be measured, it is, of course, obvious that any type of modulator may be used with equally good results without departing from the scope of the present invention.

The invention claimed is:

1. In combination a load circuit with current and potential terminals therefor, vacuum tubes each having an input circuit, means for associating said input circuits with said current and potential terminals, an output circuit for said tubes, and a direct current indicating device contained in said output circuit for indicating the power consumed by the load circuit.

2. In combination a load circuit having current and potential terminals, a plurality of vacuum tubes each having an input circuit, an output circuit for said tubes, means for associating said input circuits with said current and potential terminals, and a direct current indicating device directly and conductively connected to the output circuit of said vacuum tubes for indicating the power consumed by said load circuit.

3. In combination with a load circuit, a pair of thermionic devices each having an input circuit, an output circuit for said devices, means for associating said input circuits in a series relation and in shunt relation with said load circuit, and a direct current indicating device contained in the output circuit of said thermionic devices for indicating the power consumed by the load circuit.

4. In combination, a pair of thermionic devices, a power circuit containing a given load, means for associating in a power measuring relation said circuit with the input circuits of said devices, and a direct current measuring instrument connected in the output circuit of said devices for indicating the power absorbed by said load.

5. In combination, a direct current indicating instrument, a pair of vacuum tubes, an output circuit for said tubes, said output circuit being directly connected to said instrument, a power circuit containing an impedance load, and circuit connections for directly and conductively connecting said load to the input circuits of said tubes serially and in a parallel manner whereby the current absorbed by the load may be determined directly by said indicating instrument.

6. In combination with a circuit containing a given load, a push-pull modulator, a direct current measuring instrument connected in the output circuit of said modulator, and circuit connections for connecting said load circuit in a power measuring relation with the input circuit of said modulator whereby the indication of said measuring instrument is a direct measure of the power consumption of the load.

7. In combination with a circuit containing a given load the power consumption of which is desired to be measured, a pair of electron discharge devices connected in push-pull relation, a direct current measuring instrument connected in the output circuit of said devices, and circuit connections for connecting said load circuit in serial and shunt relations with the input circuits of said electron discharge devices whereby the indication of said measuring instrument is a direct measure of the power absorbed by said load.

8. In combination, a load circuit, vacuum tubes having an input circuit, an output circuit for said tubes, means for impressing on said input circuits voltages corresponding to the voltage of the load circuit and for simultaneously impressing on said input circuits voltages corresponding to the current in said load circuit, and a direct current indicating device in said output circuit for indicating the power expended in said load circuit.

9. In combination, a load circuit, vacuum tubes each having an input circuit, an output circuit for said tubes, means for varying the space current in each of said tubes in accordance with the instantaneous power in said load circuit, and a direct current indicating device in said output circuit for giving an indication proportional to the simultaneous changes of the space currents in said tubes.

In witness whereof, I hereunto subscribe my name this 24th day of April A. D., 1922.

EUGENE PETERSON.